(12) United States Patent
Di Cola et al.

(10) Patent No.: US 7,167,845 B2
(45) Date of Patent: Jan. 23, 2007

(54) PROCESS FOR PERFORMING FUZZY PROCEDURES IN PROCESSING DEVICES, CORRESPONDING PROCESSING DEVICE AND COMPUTER PROGRAM PRODUCT

(75) Inventors: Eusebio Di Cola, Messina (IT); Federico Rivoli, Messina (IT); Salvatore Lucio Ticli, San Giovanni la Punta (IT); Rosario Martorana, Messina (IT)

(73) Assignee: STMicroelectronics S.R.L., Agrate Brianza (MI) (IT)

( * ) Notice: Subject to any disclaimer, the term of this patent is extended or adjusted under 35 U.S.C. 154(b) by 325 days.

(21) Appl. No.: 10/931,266

(22) Filed: Aug. 30, 2004

(65) Prior Publication Data

US 2005/0086190 A1    Apr. 21, 2005

(30) Foreign Application Priority Data

Oct. 16, 2003    (EP) .................... 03425670

(51) Int. Cl.
*G06F 15/18* (2006.01)
(52) U.S. Cl. .......................................... 706/1
(58) Field of Classification Search .................. 706/1, 706/52
See application file for complete search history.

(56) References Cited

U.S. PATENT DOCUMENTS 5,179,625 A * 1/1993 Hisano ........................ 706/1
5,184,131 A * 2/1993 Ikeda ........................ 341/165
5,305,424 A * 4/1994 Ma et al. ..................... 706/52
5,424,886 A * 6/1995 Tomitaka ................. 360/77.01
5,710,867 A * 1/1998 Giacalone et al. ............. 706/1
5,825,906 A * 10/1998 Obata et al. ................. 382/119
6,188,998 B1 * 2/2001 Cuce' et al. ................... 706/7
6,199,056 B1   3/2001 Pappalardo et al.

FOREIGN PATENT DOCUMENTS

EP          0 516 161 A2     5/1992
EP          0675 431 A1      3/1994
WO          WO 95/30186      11/1995

OTHER PUBLICATIONS

EP 03 42 5670 European Search Report, Jun. 8, 2004.

* cited by examiner

*Primary Examiner*—Anthony Knight
*Assistant Examiner*—Michael B. Holmes
(74) *Attorney, Agent, or Firm*—Hogan & Hartson LLP

(57) ABSTRACT

A method and related system for performing fuzzy procedures in processing devices. The method provides for calculating a degree of activation of a fuzzy proposition represented by input values having a fuzzy set associated to a triangular or trapezoidal membership function. The membership function is defined by a defined range of the input values and by an abscissa of the maximum value assumed by said membership. The method includes storing solve values corresponding to the range of definition and to the abscissa of the maximum value. The degree of activation is calculated as a function of the stored solve values, and storing of solve values includes storing the values measured on the abscissa and further at least one value measured on the ordinate corresponding to the membership function.

20 Claims, 8 Drawing Sheets

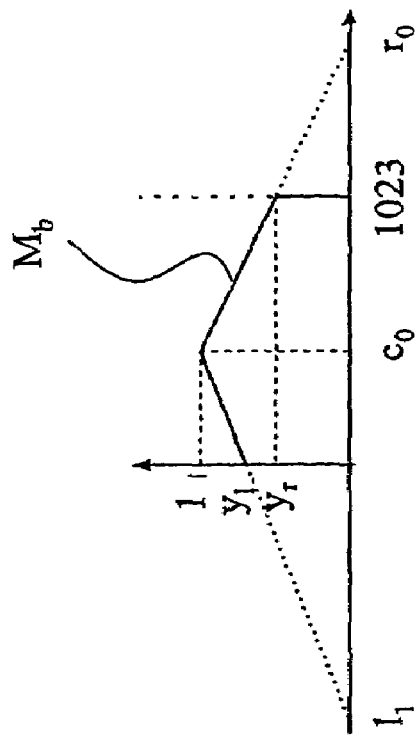
Fig. 1
PRIOR ART
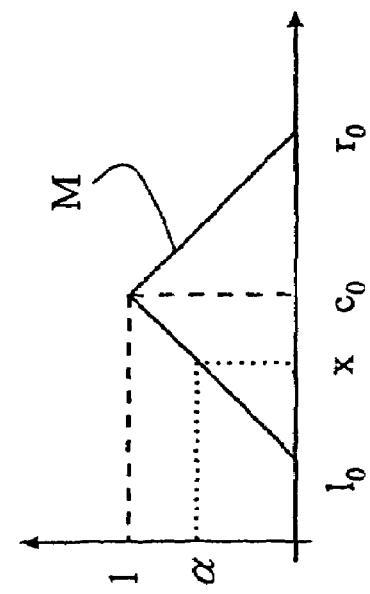
Fig. 2A
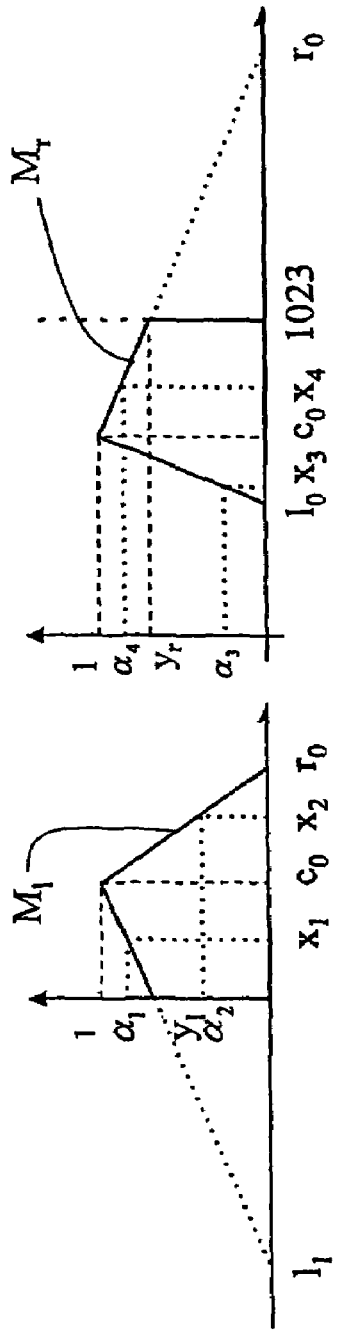
Fig. 2B
Fig. 3

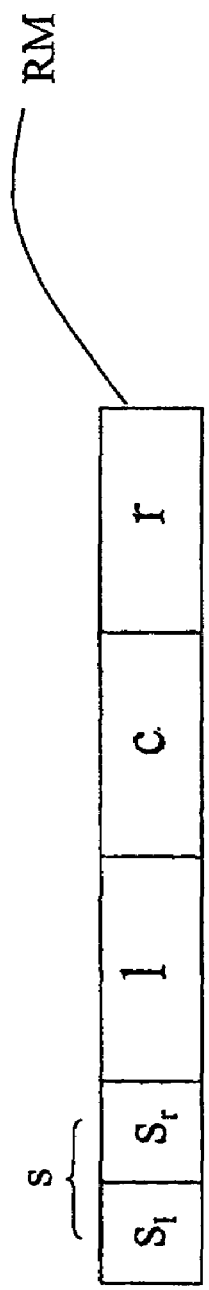
Fig. 4
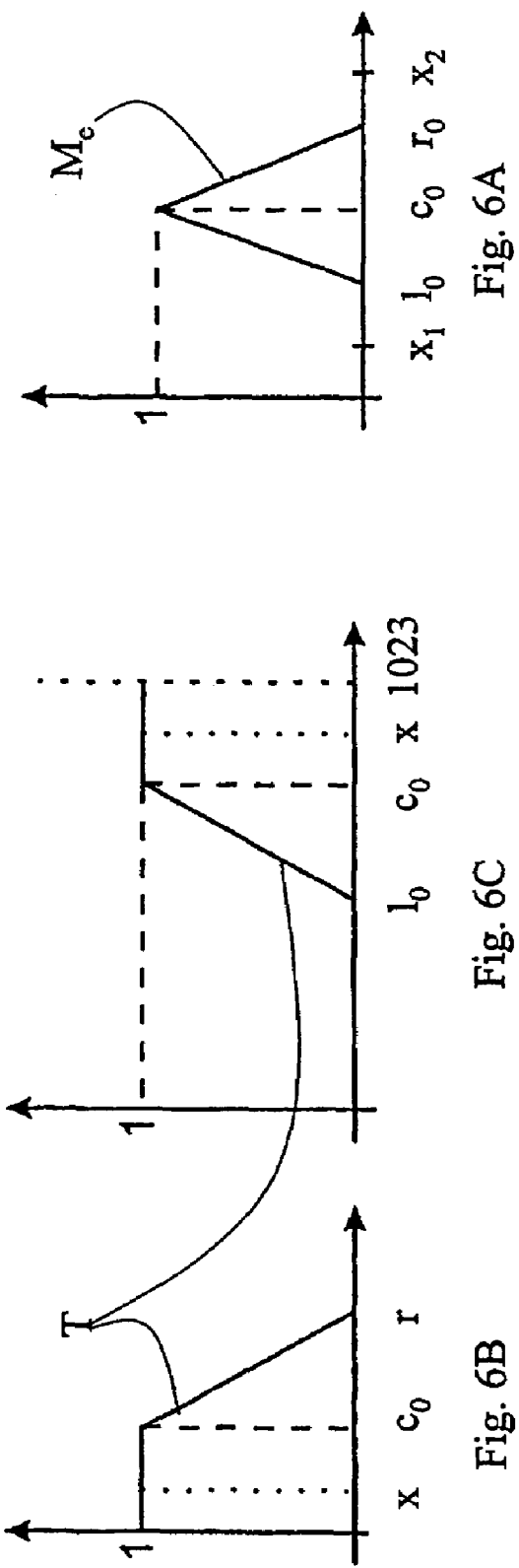
Fig. 6A
Fig. 6C
Fig. 6B

PROCESS FOR PERFORMING FUZZY PROCEDURES IN PROCESSING DEVICES, CORRESPONDING PROCESSING DEVICE AND COMPUTER PROGRAM PRODUCT

FIELD OF THE INVENTION

The present invention relates to techniques for the evaluation of functions, in particular membership functions, in fuzzy systems and has been developed with particular attention paid to its possible application in telecommunications systems and systems of an automotive type.

It is, in any case, to be borne in mind that the scope of the invention is more general. The invention is, in fact, applicable to all processing systems, for example microcontrollers, in which there occur conditions of operation of the same type as the ones described in what follows.

BACKGROUND OF THE INVENTION

Traditional techniques for analytical/numerical analysis are intrinsically not suitable for dealing with problems concerning systems characterized by high complexity and marked non-linearity. In fact, the ability to make precise and significant decisions decreases as the complexity of the system increases.

Fuzzy logic is based upon the formal principles of approximate reasoning, with the aim of modelling the capabilities peculiar to a human mind of making rational decisions in contexts characterized by uncertainty and imprecision. The alternative approach proposed by fuzzy logic is founded upon the assumption that the key elements of human thought are not numbers, but expressions that identify the so-called 'fuzzy set', i.e., classes of objects for which passage from membership to non-membership is not rigid, as is the case of Boolean logic, but is instead gradual.

Fuzzy logic, therefore, addresses the problem of assigning values of truth to statements for which it is not possible to unequivocally establish trueness or falseness and for which the classic two-value logic is insufficient. In other words, according to fuzzy logic, a value is not declared as belonging to a fuzzy set or otherwise, but a value is declared as belonging to a fuzzy set with a degree of activation $\alpha \leq 1$.

The peculiarity of this logic lies in the possibility that it affords to operate on systems for which a characterization of a qualitative type, i.e., linguistic, is envisaged. The characteristics of fuzzy logic are: use of linguistic variables instead of numerical variables and relational characterization between variables through conditional proposition of a fuzzy type, called fuzzy rules.

For the above reasons, fuzzy systems are successfully used in numerous fields such as automatic control, data classification, expert systems, computer vision, and many others. Consequently, in the last few years, there has been developed a new generation of microprocessors specifically designed to solve problems linked to fuzzy logic. Once the fuzzy sets have been defined together with the respective membership functions and fuzzy rules, these microprocessors enable, given input values, calculation of the outputs of the system.

Consider, for example, two fuzzy sets A and B, which can be expressed qualitatively through expressions that define the state of a motor vehicle. For example, the fuzzy set A represents the condition "high speed" and the fuzzy set B the condition "brake pressed". Associated to each of these two fuzzy sets A and B is a membership function, which is used for obtaining a degree of membership $\alpha$ of an element, which can be a value of speed or a value of pressure on the brake, of the corresponding fuzzy set.

As already mentioned, the said fuzzy sets are obtained via fuzzy rules. For example, consider the following conditional fuzzy expression: "IF the speed is high, THEN the brake is to be pressed". This expression is formalized in the following fuzzy rule: "IF x is A then y is B", where x represents an input of the system corresponding to a value of speed, and y an output corresponding to a value of pressure to be applied on the brake. In modelling of real systems, there are a number of fuzzy sets and fuzzy rules and, via the various fuzzy operations, an output value y is obtained from an input value x.

The adoption of hardware processing modules, such as microprocessors and microcontrollers, enables storage of the membership functions and fuzzy rules in a memory and enables all the necessary operations to be performed, namely, operations of fuzzification, rules evaluation, approximate reasoning, and defuzzification. One of the main operations, which a microprocessor for fuzzy logic must perform, is, hence, calculation of the degree of truth or membership associated to a fuzzy clause.

FIG. 1 shows a diagram representing a membership function M of a triangular type, corresponding to a fuzzy set A. On the ordinate, there are represented the input values pertaining to the propositions of which the degree of truth or activation is to be evaluated, and, in particular, x represents a generic input value of the system. If "x is A" is a fuzzy phrase, the degree of activation $\alpha$ is given by the point of intersection between the membership function M and the straight line parallel to the ordinate axis passing through the input value x.

In FIG. 1, a lower limit of the range of definition of the input values x for the membership function M for which a degree of membership different from zero is obtained is designated by $l_0$, and $r_0$ designates an upper limit of the range of definition of the input values x for the membership function M for which a degree of membership different from zero is obtained. In this figure, $c_0$ is an abscissa of the maximum of the membership function M, i.e., the value of the input for which the degree of membership $\alpha$ is 1.

A hardware architecture which enables execution of the operations necessary to a fuzzy system is described in the European Patent Application No. 1102175, entitled: "*Neuro-Fuzzy network architecture with on-line learning capabilities and corresponding control method*", which also describes the use of triangular membership functions. The triangular membership functions are to be stored in a memory, and hence, known to the art is storage of a set of solve values, which enable, with appropriate processing, reconstruction of the triangle or, more in general, of the polygon identified by the membership function. It is consequently known to store three resolution values designated respectively by l, c and r, i.e., storing, as a value of the lower limit l, a distance from the lower limit $l_0 c_0$, measured between the lower limit $l_0$ and the abscissa of the maximum $c_0$, and moreover storing, as a value of the maximum c, the position of the abscissa of the maximum $c_0$, and finally, storing in memory, as a value of the upper limit r, a distance from the upper limit $c_0 r_0$, measured between the abscissa of the maximum $c_0$ and the upper limit $r_0$. Since it is known that the value of the maximum of the membership function is 1, the membership function can be readily reconstructed, starting from the solve values l, c and r, via simple linear formulae.

Operating with a finite integer number N of bits, for example 10 bits, the maximum number n that can be represented by an N-bit processor is $2^N-1$, i.e., in the example, $2^{10}-1=1023$. This entails that the distance from the lower limit $l_0c_0$ and the distance from the upper limit $c_0r_0$ cannot exceed n, i.e., 1023, so that, with an architecture of this sort it is not possible to use triangular membership functions having a distance from the lower limit or a distance from the upper limit greater than the maximum representable number n defined by the number N of bits. In other words, it is not possible to represent triangular membership functions that have a range of inputs which exceeds the limit imposed by the number of bits N with which the microprocessor operates.

SUMMARY OF THE INVENTION

The present invention provides a solution to the above problems that enables triangular membership functions of the inputs to be rendered independent of the number of bits with which a computer operates.

According to one aspect of the invention, a process is provided for performing fuzzy procedures in computer devices, which has the characteristics recalled specifically in the claims that follow. The invention relates also to the corresponding processing device, as well as the corresponding computer-program product, directly loadable into the memory of a computer, such as a processor, and comprising software code portions for performing the process according to the invention when the product is run on a computer.

In one embodiment, a method according to the invention provides for storing among the solve values, instead of the distance between the abscissa of the maximum of the membership function and the lower limit or upper limit, a value of ordinate which depends upon the position of said lower limit or upper limit. As compared to known solutions, the method proposed herein provides a digital hardware module that can be used for calculation of the degree of truth of a fuzzy proposition, which has a fuzzy set characterized by a triangular or trapezoidal membership function. Hence, the inventive method eliminates or addresses the limitations that rise from the maximum representable number when a given number of bits is used.

In addition, the proposed method brings about an optimization of the area of memory in which the membership function and fuzzy rules are stored, operating in such a way that a number of fuzzy rules can be allocated in a smaller amount of memory. The hardware module proposed is used in some embodiments as a module of a microprocessor that enables calculation of the other fuzzy operations.

BRIEF DESCRIPTION OF THE DRAWINGS

The invention will now be described, purely by way of non-limiting example, with reference to the annexed drawings, in which:

FIG. 1, which in itself corresponds to the known art, has already been described previously;

FIGS. 2A and 2B show diagrams of membership functions that can be processed using the process for performing fuzzy procedures according to the invention;

FIG. 3 shows a diagram of a further membership function processed using the process for performing fuzzy procedures according to the invention;

FIG. 4 illustrates a schematic block diagram of a memory register of a device for processing fuzzy procedures which implements the process for performing fuzzy procedures according to the invention;

FIGS. 6A, 6B and 6C show further diagrams of membership functions processed using the process for performing fuzzy procedures according to the invention;

DETAILED DESCRIPTION OF PREFERRED EMBODIMENTS

Figure 5:
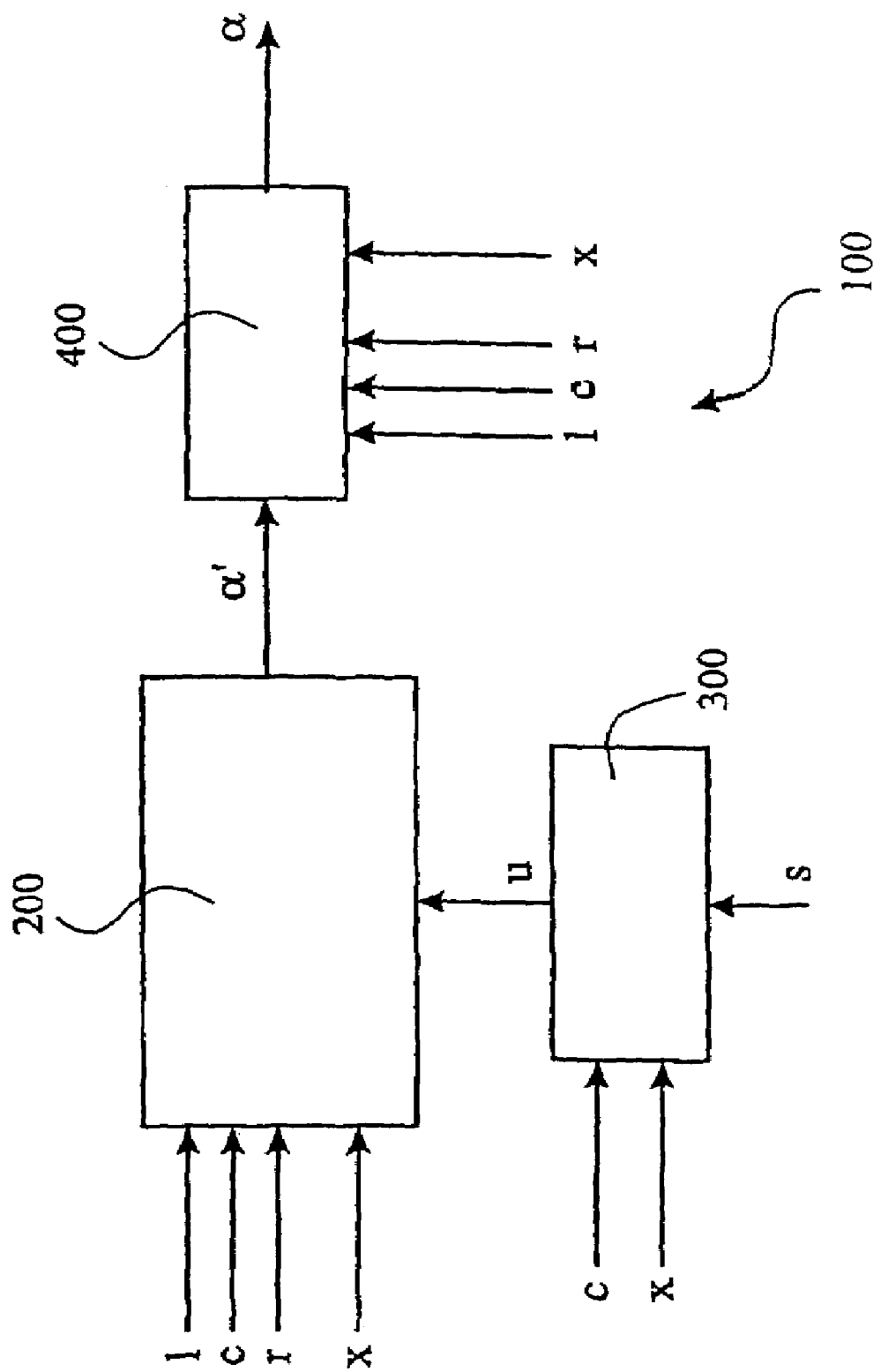
FIG. 5 illustrates a block diagram of a module for calculating membership functions of the device for processing fuzzy procedures according to the invention.

FIGS. 2A and 2B represent, respectively, triangular membership functions $M_l$ and $M_r$, which have distances of the ordinate of the maximum from one of the limits of the range of definition greater than the maximum representable number n imposed by the number N of bits with which the computer operates. For simplicity, in what follows, the number N of bits is assumed as being 10 bits, so that the maximum representable number n is 1023.

In FIG. 2A, the membership function $M_l$ has a lower limit $l_1$ such that a distance from the lower limit $l_1c_0$, i.e., a distance from the abscissa of the maximum $c_0$, reaches an absolute value greater than the maximum representable number n. Further represented in FIG. 2A are input values $x_1$ and $x_2$, which are, respectively, smaller and greater than the abscissa of the maximum $c_0$ and to which there correspond respective degrees of membership $\alpha_1$ and $\alpha_2$ according to the membership function $M_l$.

Likewise, represented in FIG. 2B is a membership function $M_r$ having an upper limit $r_1$ such that a distance from the upper limit $c_0r_1$, i.e., a distance from the abscissa of the maximum $c_0$, reaches an absolute value greater than the maximum representable number n. Further represented in FIG. 2B are the input values $x_3$ and $x_4$, which are, respectively, smaller and greater than of the abscissa of the maximum $c_0$ and to which there correspond respective degrees of membership $\alpha_3$ and $\alpha_4$ according to the membership function $M_r$.

The membership functions $M_l$ and $M_r$ just described cannot, therefore, be represented with a number N of bits on account of the position of the respective lower limit $l_1$ and upper limit $r_1$, and hence, cannot be used by computer devices for execution of known fuzzy procedures.

One embodiment of a process according to the invention for performing fuzzy procedures in computer devices basically provides for representing triangular membership functions, such as the functions $M_l$ and $M_r$ described above. The process includes storing for the membership function $M_l$, as a value of the maximum c, the position of the abscissa of the maximum $c_0$, as a value of the upper limit r, the distance from the upper limit $c_0r_0$, and, as a value of the lower limit l, the position of a point $y_l$ corresponding to the intersection of the membership function with the axis of the ordinate. This can be contrasted storing the distance from the lower limit $l_1c_0$ as occurs with known processes. Likewise, for the membership function $M_r$ of FIG. 2B there is stored in memory, as a value of the upper limit r, instead of the distance from the upper limit $c_0r_1$, the position of a point $y_r$, which is the projection on the axis of the ordinate of the intersection between the membership function and the straight line passing through the point 1023, corresponding to the maximum representable number n, perpendicular to the axis of the abscissa.

FIG. 3 represents a further type of triangular membership function. The function is designated by the reference $M_b$ and may be thought of as a combination of the membership functions $M_l$ and $M_r$. Its range of definition of the input values x is distinguished both by a lower limit $l_1$ and by an upper limit $r_1$, which give distances from the abscissa of the maximum $c_0$ greater than the maximum representable number n.

The process proposed for performing fuzzy procedures is designed to operate with the membership functions $M_l$ and $M_r$, as well as with membership functions characterized by a representable range of definition of the inputs, such as the function M shown in FIG. 1, and with membership functions with both of the limits of the range of definition of the inputs not representable, such as the function $M_b$ of FIG. 3, which is a combination of the membership functions $M_l$ and $M_r$.

For this purpose, for calculation of the degree of activation α, four different cases can be distinguished according to the position of the input value x with respect to the abscissa of the maximum $c_0$ and according to the type of triangular membership function to be stored. These four cases are identified in FIGS. 2A and 2B by the position of the input values $x_1$, $x_2$, $x_3$ and $x_4$. As already mentioned, a membership function M is in general characterized by storing in memory the values of the lower limit l, the upper limit r, and the maximum c.

In this regard, FIG. 4 represents a memory register RM used in a processing device for performing fuzzy procedures that implements the process proposed herein. In the memory register RM, there are allocated memory areas corresponding to the values of the lower limit l, the upper limit r, and the maximum c. The register RM provides for allocating a bit $s_l$ to indicate whether in the location of the value of the lower limit l there should be inserted the distance from the lower limit $l_0 c_0$, as in the case of FIG. 1, or else the ordinate of the point $y_l$ of intersection with the axis of the abscissa of the membership function, if the membership function is of the same type as the membership function $M_l$ of FIG. 2A. In the first case, the information is stored setting the bit $s_l$ at zero, and in the second case, the bit $s_l$ is set at one.

Likewise, in the memory register RM, a bit $s_r$ is allocated to indicate whether in the location of the value of the upper limit r there should be stored the distance from the upper limit $c_0 r_0$, as for the function $M_r$ of FIG. 1 or else the position of the projection on the axis of the ordinate of the intersection between the membership function and the straight line passing through the ordinate corresponding to the maximum representable number n, as for the membership function $M_r$ of FIG. 2B. In the first case, the bit $s_r$ is set at zero, and in the second case, the bit $s_r$ is set at one. The bits $s_l$ and $s_r$ together form a characterization signal s, which can assume four different values to indicate the type of membership function stored in the register MR.

FIG. 5 shows a block diagram of a circuit 100 for calculation of the degree of membership in the computer for performing fuzzy procedures. The circuit 100 for calculation of the degree of membership comprises an inference module 200. The module 200 receives at input the value of the lower limit l, the value of the maximum c, the value of the upper limit r from the memory register RM, and the input value x.

The inference module 200 further receives a selection signal u from a selector circuit 300, which has as inputs the value of the maximum c and the input value x. The selector circuit 300 operates under the control of the characterization signal s. The inference module 200 supplies at output a calculated degree of activation α', which is sent at input to a saturation-managing module 400. The module 400 further receives at input the value of the lower limit l, the value of the maximum c, the value of the upper limit r and the input value x. At output from the saturation-managing module 400 there is the degree of activation α.

The inference module 200 carries out calculation of the intersection between the straight line that passes through the input value x and is perpendicular to the axis of the abscissa and the membership function. The selector module 300 functions to distinguish between the four cases mentioned previously.

The saturation-managing module 400 is used for handling two further possible cases:

the case in which the input value x lies outside the range of definition of the membership function, as for the membership function $M_e$ shown in FIG. 6A, where the input values $x_1$ and $x_2$ fall outside the interval defined by the lower limit $l_0$ and the upper limit $r_0$; in this case, the degree of activation α is zero irrespective of the value α' obtained from the inference module 200; and the case in which the membership functions are trapezoidal membership functions T, like the ones represented in FIGS. 6B and 6C; in the case represented in FIG. 6B, the value of the lower limit l is considered as being zero, and in the case represented in FIG. 6C, the value of the upper limit r is considered as being zero. In both of the cases represented in FIGS. 6B and 6C, the degree of activation α referred to the input value x represented in the figures is 1.

Figure 7:
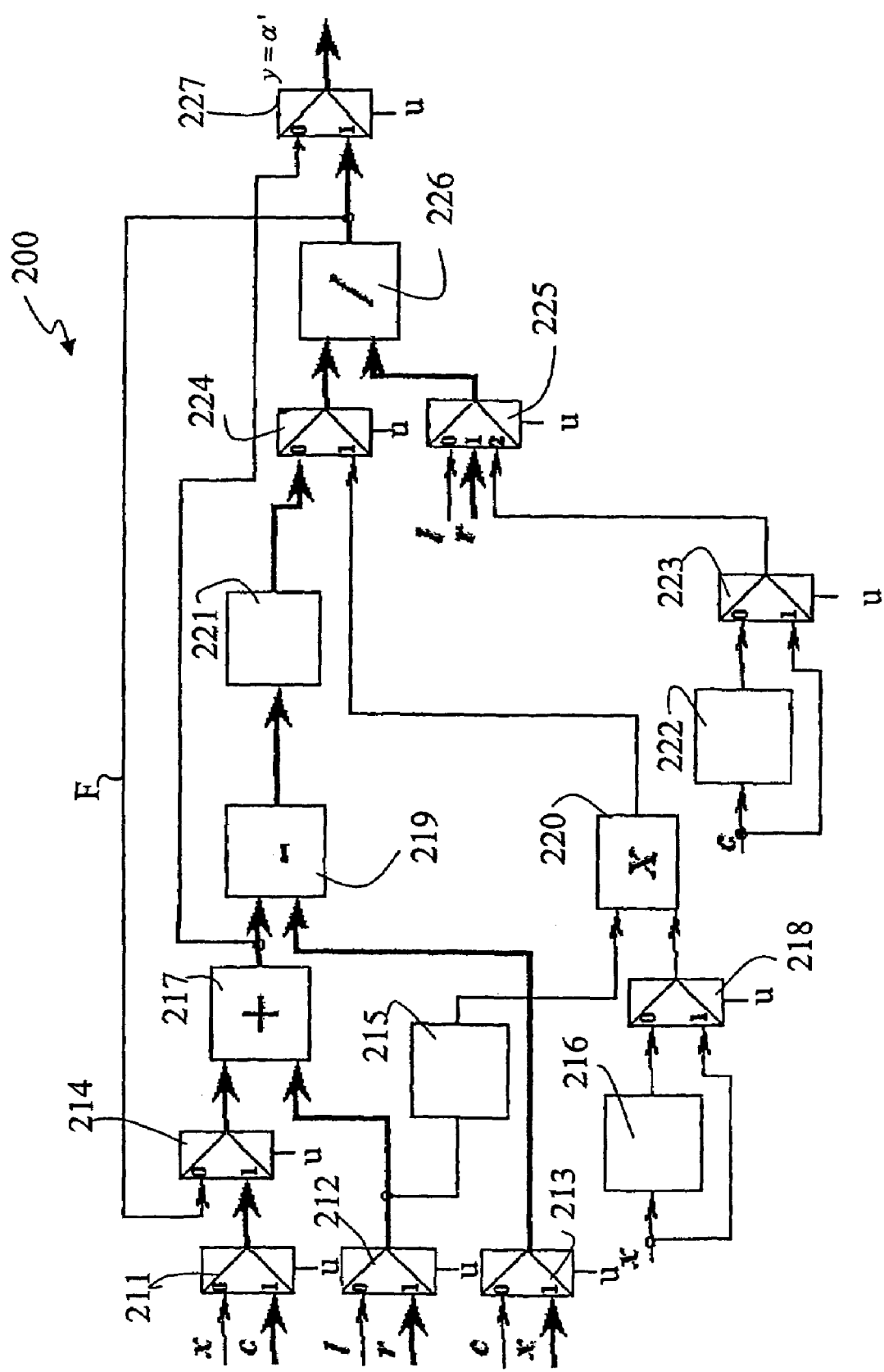
FIG. 7 illustrates a detailed diagram of an inference module belonging to the calculation module of FIG. 5.

FIG. 7 illustrates the block diagram of the inference module 200, where the output y is the calculated degree of activation α'. The input value x and the maximum value c are sent at input to a first two-input multiplexer 211. The values of the lower limit l and of the upper limit r are sent at input to a second multiplexer 212, similar to the first multiplexer 211. The output of the first multiplexer 211 is connected to one of the inputs of a third multiplexer 214, which receives on the other input thereof a feedback signal F. The outputs of the third multiplexer 214 and the second multiplexer 212 constitute the inputs of an adder block 217. The output of the adder block 217 constitutes one of the inputs of a subtractor block 219.

The value of the maximum c and the input value x also constitute the inputs of a fourth multiplexer 213, the output of which constitutes the other input of the subtractor block 219. The output of the subtractor block 219 is supplied to a multiplier circuit 221, which executes a multiplication by $2^N$, i.e., by 1023, in the example of implementation described. The output of the multiplier circuit 221 is one of the inputs of a fifth multiplexer 224. The input value x constitutes also the input of a first complementing circuit 216, which executes the $2^N$-complement of the input, i.e., supplies at output 2 N minus the input value, and of a sixth multiplexer 218, the other input of which is the output of the complementing circuit 216 itself.

The output of the sixth multiplexer 218 and the output of the second multiplexer 212, $2^N$-complemented in a second complementing circuit 215, are the inputs of a multiplier block 220. The output of the multiplier block 220 is the other input of the fifth multiplexer 224. The value of the maximum c is the input also of a third complementing circuit 222 and of a seventh multiplexer 223, the other input of which is the output of the complementing circuit 222 itself. The output of the seventh multiplexer 223 constitutes one of the inputs of a selection circuit 225, which receives also at input the value of the lower limit l and the value of the upper limit r. The selection circuit 223 is also basically a multiplexer with a number of inputs, which operates under the control of the selection signal u.

The output of the selection circuit 225 and the output of the fifth multiplexer 224 are the inputs of a divider circuit 226. The output of the divider circuit 226 is sent at input to an eighth multiplexer 227, together with the output of the adder 217. The output of the divider circuit 226 is also taken as feedback signal F and fed back to the input of the third multiplexer 214. The output of the eighth multiplexer 227 constitutes the calculated degree of activation α', i.e., the output y of the inference module 200.

The first multiplexer 211, the second multiplexer 212, the third multiplexer 214, the fourth multiplexer 213, the fifth multiplexer 224, the sixth multiplexer 218 and the seventh multiplexer 223 carry out the selection between just two inputs under the control of the selection signal u. According to the selection signal u, which operates on the various multiplexers, the inference module 200 can assume four different logic configurations corresponding to the four cases identified for example by the positions of the input values $x_1$, $x_2$, $x_3$, $x_4$ in FIGS. 2A and 2B. These logic configurations are shown in FIGS. 8, 9, 10 and 11.

Figure 8:
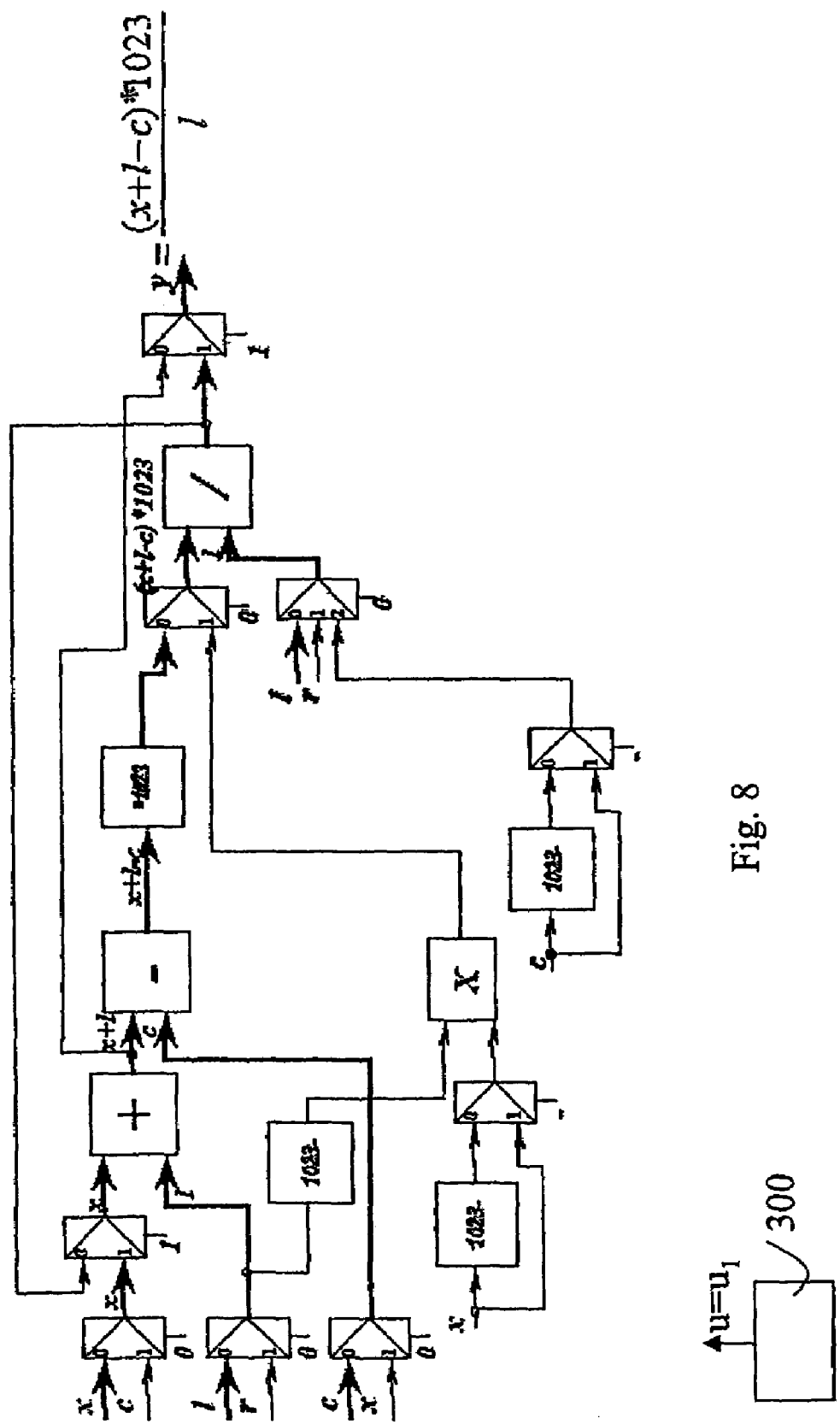
FIG. 8 illustrates the module of FIG. 7 in a first operating configuration.

FIG. 8 represents a first configuration corresponding to the case in which the degree of activation is to be calculated when the input value is $x_1$. By solving a simple system, the corresponding degree of activation is easily obtained:

$$\alpha_1 = 1 + \frac{x_1 \cdot (1023 - 1)}{c} \tag{1}$$

FIG. 8 shows the values that must be applied to the selection inputs of the various multiplexers. These are obtained via the selector module 300, which will be described in greater detail hereinafter.

Figure 9:
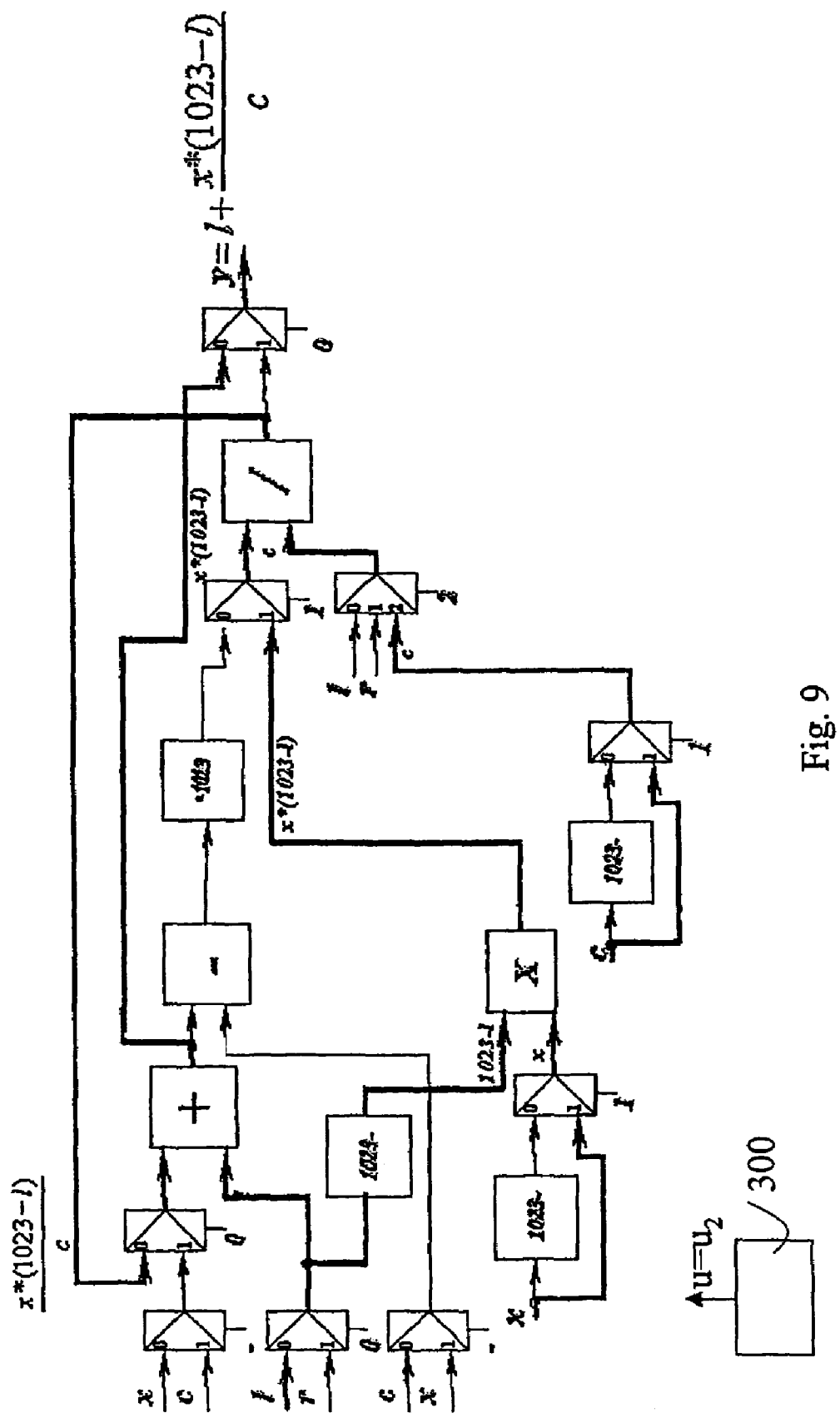
FIG. 9 illustrates the module of FIG. 7 in a second operating configuration.

Likewise, FIG. 9 represents a second configuration corresponding to the case in which the degree of activation is to be calculated when the input value is $x_2$. It may be readily verified that the degree of activation is:

$$\alpha_2 = \frac{(c + r - x_2) \cdot 1023}{r} \tag{2}$$

FIG. 9 shows the values that must be applied to the selection inputs of the various multiplexers.

Figure 10:
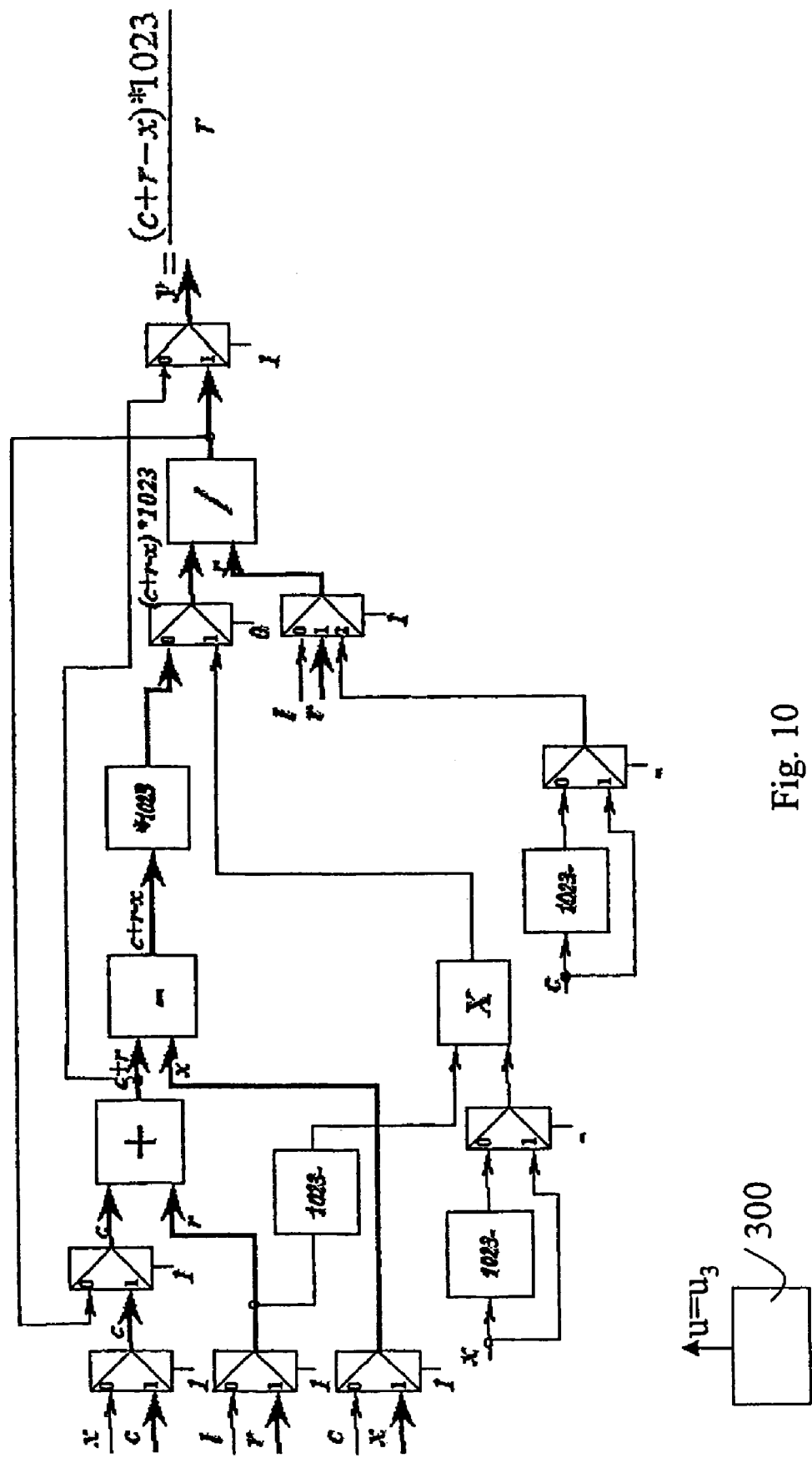
FIG. 10 illustrates the module of FIG. 7 in a third operating configuration.

FIG. 10 represents a second configuration corresponding to the case in which the degree of activation is to be calculated when the input value is $x_3$. It may be readily verified that the degree of activation is:

$$\alpha_2 = \frac{(x_3 + 1 - c) \cdot 1023}{1} \tag{3}$$

FIG. 10 shows the values that must be applied to the selection inputs of the various multiplexers.

Figure 11:
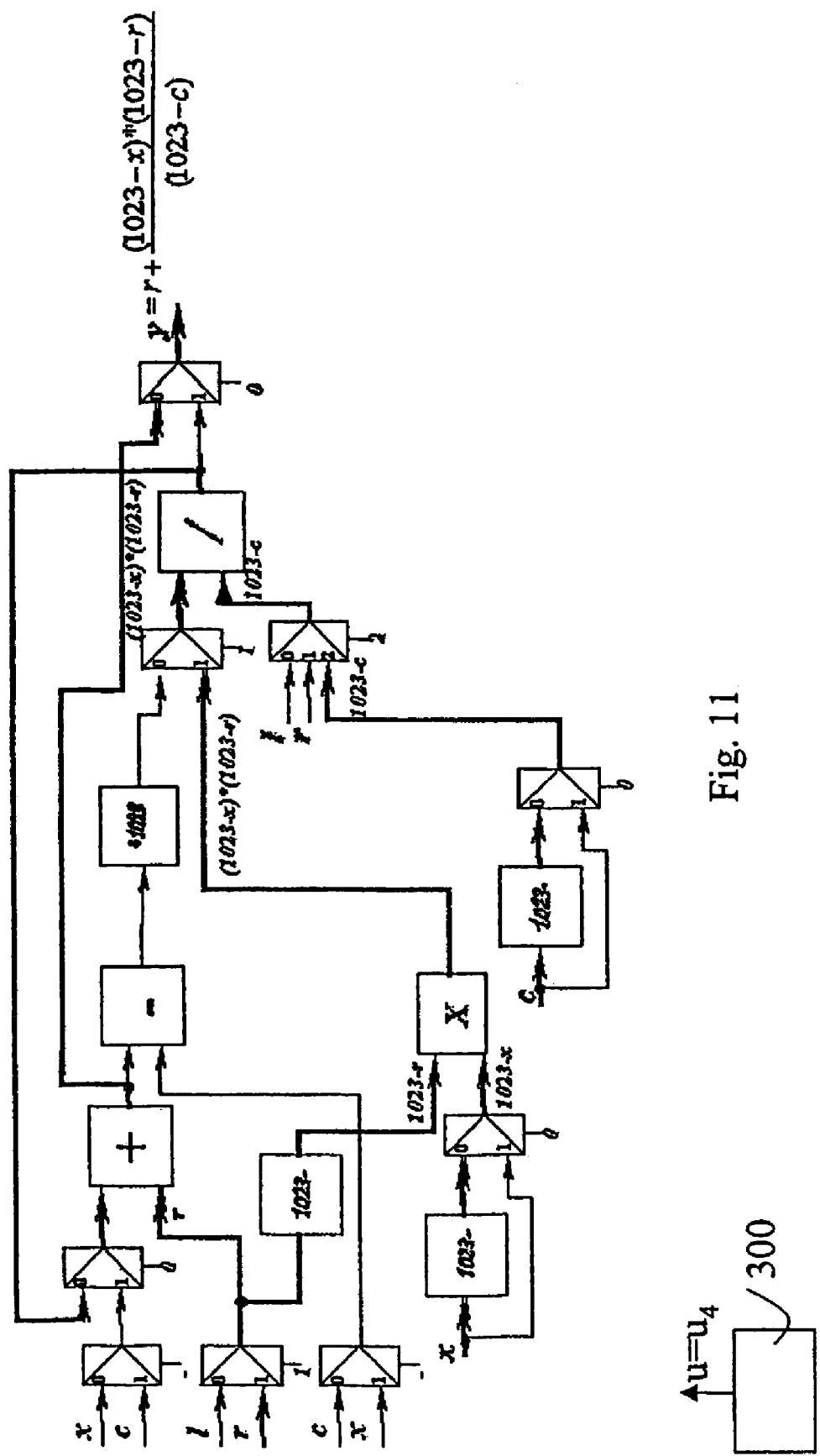
FIG. 11 illustrates the module of FIG. 7 in a fourth operating configuration.

Likewise, FIG. 11 represents a second configuration corresponding to the case in which the degree of activation is to be calculated when the input value is $x_4$. It may be readily verified that the degree of activation is:

$$\alpha_4 = r + \frac{(1023 - x_4) \cdot (1023 - r)}{(1023 - c)} \tag{4}$$

FIG. 11 shows the values that must be applied to the selection inputs of the various multiplexers.

In order for the calculation carried out by the inference module 200 just described to be correct, there preferably is selected, according to the selection inputs of the multiplexers, one of the four possible cases which can be handled by said module 200 in one of the four configurations described with reference to FIGS. 8, 9, 10 and 11.

This task is performed by the selector module 300, which, as shown in FIG. 7, has as inputs the value of the maximum c and the input value x, and operates under the control of the characterization signal s. The selector module 300 supplies, as output value, the selection signal u, which is substantially a bus signal made up of the bits that will select the various configurations of the multiplexers of the inference module 200.

The selection signal u can assume four values—namely $u_1$, $u_2$, $u_3$ and $u_4$—according to the four possible cases and is obtained from the following relations:
If x<c And $s_l$=1 Then u=$u_1$ (first case, input $x_1$)
If x>c And $s_r$=OR Then u=$u_2$ (second case, input $x_2$)
If x<c And $s_l$=0 Then u=$u_3$ (third case, input $x_3$)
If x>c And $s_r$=1 Then u=$u_4$ (fourth case, input $x_4$)

Finally, as already mentioned, the saturation-managing module 400 has the function of managing the situations in which the membership functions and the input values x correspond to the further cases represented in FIGS. 6A, 6B and 6C, i.e., the cases where the input values are outside the range of definition of the membership function and of the trapezoidal functions. The module 400 receives as inputs the value of the maximum c, the input value x, the value of the lower limit l, and the value of the upper limit r. Additionally, the module 400 receives the calculated degree of activation α' and supplies at output the value of the degree of activation α, obtained applying the following relations:
If x>r Then α=0 If x<c Then α=0
If l=0 And x<c Then α=1
If r=0 And x>c Then α=1

In all the other cases, the module 400 sets α=α' as degree of activation.

The solution just described enables considerable advantages to be achieved as compared to known solutions. The process proposed for performing fuzzy procedures advantageously comprises a digital hardware module that can be used for calculation of the degree of activation of a fuzzy proposition, having a fuzzy set characterized by a triangular or trapezoidal membership function, eliminating the limitations that rise from the maximum number that can be represented using a given number of bits. Furthermore, the area of memory in which the membership function and fuzzy rules are stored is optimized, allowing storage of a number of fuzzy rules in a smaller amount of memory.

Of course, without prejudice to the principle of the invention, the details of implementation and the embodiments may vary widely with respect to what is described and illustrated herein, without thereby departing from the scope of the present invention, as defined in the annexed claims.

The invention claimed is:

1. A method for performing fuzzy procedures in processing devices that provides for calculating a degree of activation of a fuzzy proposition represented by input values, said process comprising:
   storing, in a medium readable by procesing devices, solve values corresponding to a range of definition of the input values and to an abscissa of the maximum value for a triangular or trapezoidal membership function, the membership function being defined at least in part by the range of definition and the abscissa; and
   calculating a degree of activation of the fuzzy proposition as a function of said stored solve values eliminating limitations that arise from a maximum number that can be represented using a given number of bits;
   wherein said storing solve values comprises storing at least one value measured on the abscissa and storing at least one value measured on an ordinate and corresponding to said membership function, and wherein said storing of said solve values corresponding to said membership functions is optimized such that fuzzy rules can be allocated in a smaller amount of the storage medium.

2. The method of claim 1, wherein said at least one value measured on the abscissa is stored as a lower-limit value and is a distance from the lower limit measured between a lower limit and the abscissa of the maximum.

3. The method of claim 2, wherein said at least one value measured on the ordinate and corresponding to said membership function is a position of the ordinate corresponding to an intersection of the membership function with the ordinate axis if said distance from the lower limit reaches an absolute value greater than a maximum representable value.

4. The method of claim 3, wherein said at least one value measured on the abscissa is stored as an upper-limit value and is a distance from the upper limit measured between the abscissa of the maximum and the upper limit and further wherein said at least one value measured along the ordinate and corresponding to said membership function is a position of a projection on the ordinate axis of an intersection between the membership function and a straight line passing through the abscissa of the maximum representable number.

5. The method of claim 4, further comprising when the membership function is of a trapezoidal type, setting the value of the lower limit or the value of the upper limit to zero and the value of the degree of activation to one.

6. The method of claim 2, wherein said solve values further comprise a position of the abscissa of the maximum stored as value of the maximum.

7. The method of claim 2, further comprising storing a first datum corresponding to a distance from the lower limit with respect to said maximum representable value and storing a second datum corresponding to a distance from the upper limit with respect to said maximum representable value.

8. The method of claim 7, further comprising:
   comparing the input value of said membership function with the value of the maximum; and
   combining the result of said comparing with the first datum and the second datum to generate a datum for selection of a procedure for performing the calculating of the degree of activation.

9. The method of claim 1, further comprising setting the degree of activation to zero if the input value lies outside the range of definition of the membership function.

10. A processing device for performing fuzzy procedures, comprising:
    a module for configured calculating triangular or trapezoidal membership functions; and
    means for storing, in a medium readable by processing devices, values corresponding to a range of definition of input values for the membership functions and corresponding to an abscissa of a maximum value assumed by said membership functions, wherein said storing of said values corresponding to said membership functions is optimized;
    wherein said module is further configured for receiving said input values and for receiving said values corresponding to a range of definition of input values and to an abscissa of the maximum value from said storage means; and
    further wherein said module is configured for calculating a degree of activation of said membership function eliminating maximum number limitations that arise from using a given number of bits.

11. The device of claim 10, wherein said storage means comprises memory locations for storing a lower-limit value, a value of the maximum, and an upper-limit value.

12. The device of claim 11, wherein said storage means stores solve values including at least one value measured on the abscissa and at least one value measured on an ordinate and corresponding to said membership function.

13. The device of claim 12, wherein said at least one value measured on the abscissa is stored as a lower-limit value and is a distance from the lower limit measured between a lower limit and the abscissa of the maximum.

14. The device of claim 13, wherein said at least one value measured on the ordinate and corresponding to said membership function is a position of the ordinate corresponding to an intersection of the membership function with the ordinate axis if said distance from the lower limit reaches an absolute value greater than a maximum representable value.

15. The device of claim 14, wherein said at least one value measured on the abscissa is stored as an upper-limit value and is a distance from the upper limit measured between the abscissa of the maximum and the upper limit and further wherein said at least one value measured along the ordinate and corresponding to said membership function is a position of a projection on the ordinate axis of an intersection between the membership function and a straight line passing through the abscissa of the maximum representable number.

16. The device according to claim 10, wherein the storage means stores a first datum corresponding to a distance from the lower limit with respect to said maximum representable value and stores a second datum corresponding to a distance from the upper limit with respect to said maximum representable value; and
    wherein the module operates to compare the input value of said membership function with the value of the maximum and further operates to combine the result of said comparing with the first datum and the second datum to generate a datum for selection of a procedure for performing the calculating of the degree of activation.

17. The device of claim 16, wherein said module comprises an inference module that can assume a plurality of logic configurations for calculating the degree of activation of said membership function.

18. The device according to claim 17, wherein said module further comprises a selector module configured for receiving the input values and the first datum and the second datum and for performing the operations of:

comparing the value reached by the input value of said membership function with the abscissa of the maximum;

combining the result of said comparison operation with the values reached by said first datum and second datum to generate a selection datum for controlling the logic configuration assumed by said inference module for calculating the degree of activation of said membership function.

19. The device of claim 18, wherein said module comprises a handling module that receives the abscissa of the maximum, the input value, the value of the lower limit and the value of the upper limit, and the output of the inference module and is configured for setting to a zero value the degree of activation if the input value lies outside of the range of definition of the membership function.

20. A computer-program product directly loadable into the memory of a computer and comprising software code portions for performing the process according to claim 1 when the product is run on a computer.

* * * * *